(12) United States Patent
Nguyen et al.

(10) Patent No.: US 8,032,674 B2
(45) Date of Patent: Oct. 4, 2011

(54) SYSTEM AND METHOD FOR CONTROLLING BUFFER MEMORY OVERFLOW AND UNDERFLOW CONDITIONS IN STORAGE CONTROLLERS

(75) Inventors: Kha Nguyen, Anaheim, CA (US); William C. Wong, Cerritos, CA (US); Mouluan Jang, Cerritos, CA (US); Jane X. Wang, Irvine, CA (US)

(73) Assignee: Marvell International Ltd., Hamilton (BM)

( * ) Notice: Subject to any disclaimer, the term of this patent is extended or adjusted under 35 U.S.C. 154(b) by 1332 days.

(21) Appl. No.: 10/894,208

(22) Filed: Jul. 19, 2004

(65) Prior Publication Data

US 2006/0015660 A1 Jan. 19, 2006

(51) Int. Cl.
*G06F 5/00* (2006.01)
*G06F 11/00* (2006.01)

(52) U.S. Cl. ............... 710/53; 710/52; 710/57; 377/28; 377/37; 377/39; 714/706

(58) Field of Classification Search ............. None
See application file for complete search history.

(56) References Cited

U.S. PATENT DOCUMENTS

| | | | |
|---|---|---|---|
| 3,800,281 A | 3/1974 | Devore et al. |
| 3,988,716 A | 10/1976 | Fletcher et al. |
| 4,001,883 A | 1/1977 | Strout et al. |
| 4,016,368 A | 4/1977 | Apple, Jr. |
| 4,050,097 A | 9/1977 | Miu et al. |
| 4,080,649 A | 3/1978 | Calle et al. |
| 4,156,867 A | 5/1979 | Bench et al. |
| 4,225,960 A | 9/1980 | Masters |
| 4,275,457 A | 6/1981 | Leighou et al. |
| 4,390,969 A | 6/1983 | Hayes |
| 4,451,898 A | 5/1984 | Palermo et al. |
| 4,486,750 A | 12/1984 | Aoki |
| 4,500,926 A | 2/1985 | Yoshimaru et al. |
| 4,587,609 A | 5/1986 | Boudreau et al. |
| 4,603,382 A | 7/1986 | Cole et al. |
| 4,625,321 A | 11/1986 | Pechar et al. |
| 4,667,286 A | 5/1987 | Young et al. |

(Continued)

FOREIGN PATENT DOCUMENTS

EP 0528273 2/1993

(Continued)

OTHER PUBLICATIONS

International Search Report from the International Searching Authority dated Feb. 20, 2006 for Application No. PCT/US2005/024920; 5 pages.

(Continued)

*Primary Examiner* — Eron J Sorrell
*Assistant Examiner* — Dean Phan (57) ABSTRACT

A method for maintaining flow control in a buffer memory coupled to a storage controller is provided. The storage controller includes, first and second counters that are used to monitor when data is read from a buffer memory and when data is transferred from the buffer memory to the host. The method includes, incrementing first and second counter values when data is placed in the buffer memory; decrementing a first counter value when data is read from the buffer memory; and decrementing the second counter value when data is sent to a host. The method further includes, pausing a first channel logic between a transport module and a storage disk when there is no data in the buffer memory; and pausing a second channel logic between a disk and the buffer if there is no space in the buffer memory.

10 Claims, 6 Drawing Sheets

U.S. PATENT DOCUMENTS

| | | | |
|---|---|---|---|
| 4,777,635 A | 10/1988 | Glover | |
| 4,805,046 A | 2/1989 | Kuroki et al. | |
| 4,807,116 A | 2/1989 | Katzman et al. | |
| 4,807,253 A | 2/1989 | Hagenauer et al. | |
| 4,809,091 A | 2/1989 | Miyazawa et al. | |
| 4,811,282 A | 3/1989 | Masina | |
| 4,812,769 A | 3/1989 | Agoston | |
| 4,860,333 A | 8/1989 | Bitzinger et al. | |
| 4,866,606 A | 9/1989 | Kopetz | |
| 4,881,232 A | 11/1989 | Sako et al. | |
| 4,920,535 A | 4/1990 | Watanabe et al. | |
| 4,949,342 A | 8/1990 | Shimbo et al. | |
| 4,970,418 A | 11/1990 | Masterson | |
| 4,972,417 A | 11/1990 | Sako et al. | |
| 4,975,915 A | 12/1990 | Sako et al. | |
| 4,989,190 A | 1/1991 | Kuroe et al. | |
| 5,014,186 A | 5/1991 | Chisholm | |
| 5,023,612 A | 6/1991 | Liu | |
| 5,027,357 A | 6/1991 | Yu et al. | |
| 5,050,013 A | 9/1991 | Holsinger | |
| 5,051,998 A | 9/1991 | Murai et al. | |
| 5,068,755 A | 11/1991 | Hamilton et al. | |
| 5,068,857 A | 11/1991 | Yoshida | |
| 5,072,420 A | 12/1991 | Conley et al. | |
| 5,088,093 A | 2/1992 | Storch et al. | |
| 5,109,500 A | 4/1992 | Iseki et al. | |
| 5,117,442 A | 5/1992 | Hall | |
| 5,127,098 A | 6/1992 | Rosenthal et al. | |
| 5,133,062 A | 7/1992 | Joshi et al. | |
| 5,136,592 A | 8/1992 | Weng | |
| 5,146,585 A | 9/1992 | Smith, III | |
| 5,157,669 A | 10/1992 | Yu et al. | |
| 5,162,954 A | 11/1992 | Miller et al. | |
| 5,193,197 A | 3/1993 | Thacker | |
| 5,204,859 A | 4/1993 | Paesler et al. | |
| 5,218,564 A | 6/1993 | Haines et al. | |
| 5,220,569 A | 6/1993 | Hartness | |
| 5,237,593 A | 8/1993 | Fisher et al. | |
| 5,243,471 A | 9/1993 | Shinn | |
| 5,249,271 A | 9/1993 | Hopkinson | |
| 5,257,143 A | 10/1993 | Zangenehpour | |
| 5,261,081 A | 11/1993 | White et al. | |
| 5,271,018 A | 12/1993 | Chan | |
| 5,274,509 A | 12/1993 | Buch | |
| 5,276,564 A | 1/1994 | Hessing et al. | |
| 5,276,662 A | 1/1994 | Shaver, Jr. et al. | |
| 5,276,807 A | 1/1994 | Kodama et al. | |
| 5,280,488 A | 1/1994 | Glover et al. | |
| 5,285,327 A | 2/1994 | Hetzler | |
| 5,285,451 A | 2/1994 | Henson et al. | |
| 5,301,333 A | 4/1994 | Lee | |
| 5,307,216 A | 4/1994 | Cook et al. | |
| 5,315,708 A | 5/1994 | Eidler et al. | |
| 5,339,443 A | 8/1994 | Lockwood | |
| 5,361,266 A | 11/1994 | Kodama et al. | |
| 5,361,267 A | 11/1994 | Godiwala et al. | |
| 5,386,405 A * | 1/1995 | Fujiwara et al. | 369/59.19 |
| 5,408,644 A | 4/1995 | Schneider et al. | |
| 5,420,984 A | 5/1995 | Good et al. | |
| 5,428,627 A | 6/1995 | Gupta | |
| 5,440,751 A | 8/1995 | Santeler et al. | |
| 5,450,546 A * | 9/1995 | Krakirian | 710/57 |
| 5,465,343 A | 11/1995 | Henson et al. | |
| 5,487,170 A | 1/1996 | Bass et al. | |
| 5,488,688 A | 1/1996 | Gonzales et al. | |
| 5,491,701 A | 2/1996 | Zook | |
| 5,500,848 A | 3/1996 | Best et al. | |
| 5,506,989 A | 4/1996 | Boldt et al. | |
| 5,507,005 A | 4/1996 | Kojima et al. | |
| 5,519,837 A | 5/1996 | Tran | |
| 5,523,903 A | 6/1996 | Hetzler et al. | |
| 5,544,180 A | 8/1996 | Gupta | |
| 5,544,346 A | 8/1996 | Amini | |
| 5,546,545 A | 8/1996 | Rich | |
| 5,546,548 A | 8/1996 | Chen et al. | |
| 5,561,823 A | 10/1996 | Anderson et al. | |
| 5,563,896 A | 10/1996 | Nakaguchi | |
| 5,572,148 A | 11/1996 | Lytle et al. | |
| 5,574,867 A | 11/1996 | Khaira | |
| 5,581,715 A | 12/1996 | Verinsky et al. | |
| 5,583,999 A | 12/1996 | Sato et al. | |
| 5,592,404 A | 1/1997 | Zook | |
| 5,600,662 A | 2/1997 | Zook et al. | |
| 5,602,857 A | 2/1997 | Zook et al. | |
| 5,615,190 A | 3/1997 | Best et al. | |
| 5,623,672 A | 4/1997 | Popat | |
| 5,627,695 A | 5/1997 | Prins et al. | |
| 5,629,949 A | 5/1997 | Zook | |
| 5,640,602 A | 6/1997 | Takase | |
| 5,649,230 A | 7/1997 | Lentz | |
| 5,664,121 A | 9/1997 | Cerauskis | |
| 5,689,656 A | 11/1997 | Baden et al. | |
| 5,691,994 A | 11/1997 | Acosta et al. | |
| 5,692,135 A | 11/1997 | Alvarez, II et al. | |
| 5,692,165 A | 11/1997 | Jeddeloh et al. | |
| 5,719,516 A | 2/1998 | Sharpe-Geisler | |
| 5,729,718 A | 3/1998 | Au | |
| 5,740,466 A | 4/1998 | Geldman et al. | |
| 5,745,793 A | 4/1998 | Atsatt et al. | |
| 5,754,759 A | 5/1998 | Clarke et al. | |
| 5,758,188 A | 5/1998 | Appelbaum et al. | |
| 5,784,569 A | 7/1998 | Miller et al. | |
| 5,794,073 A | 8/1998 | Ramakrishnan et al. | |
| 5,801,998 A | 9/1998 | Choi | |
| 5,818,886 A | 10/1998 | Castle | |
| 5,822,142 A | 10/1998 | Hicken | |
| 5,831,922 A | 11/1998 | Choi | |
| 5,835,930 A | 11/1998 | Dobbek | |
| 5,841,722 A | 11/1998 | Willenz | |
| 5,844,844 A | 12/1998 | Bauer et al. | |
| 5,850,422 A | 12/1998 | Chen | |
| 5,854,918 A | 12/1998 | Baxter | |
| 5,890,207 A | 3/1999 | Sne et al. | |
| 5,890,210 A | 3/1999 | Ishii et al. | |
| 5,907,717 A | 5/1999 | Ellis | |
| 5,912,906 A | 6/1999 | Wu et al. | |
| 5,925,135 A | 7/1999 | Trieu et al. | |
| 5,937,435 A | 8/1999 | Dobbek et al. | |
| 5,950,223 A | 9/1999 | Chiang et al. | |
| 5,968,180 A | 10/1999 | Baco | |
| 5,983,293 A | 11/1999 | Murakami | |
| 5,991,911 A | 11/1999 | Zook | |
| 6,029,226 A | 2/2000 | Ellis et al. | |
| 6,029,250 A | 2/2000 | Keeth | |
| 6,041,417 A | 3/2000 | Hammond et al. | |
| 6,065,053 A | 5/2000 | Nouri et al. | |
| 6,067,206 A | 5/2000 | Hull et al. | |
| 6,070,200 A | 5/2000 | Gates et al. | |
| 6,078,447 A | 6/2000 | Sim | |
| 6,081,849 A | 6/2000 | Born et al. | |
| 6,092,231 A | 7/2000 | Sze | |
| 6,094,320 A | 7/2000 | Ahn | |
| 6,124,994 A | 9/2000 | Malone, Sr. | |
| 6,134,063 A | 10/2000 | Weston-Lewis et al. | |
| 6,157,984 A | 12/2000 | Fisher | |
| 6,178,486 B1 | 1/2001 | Gill et al. | |
| 6,185,640 B1 * | 2/2001 | Ross | 710/53 |
| 6,192,499 B1 | 2/2001 | Yang | |
| 6,201,655 B1 | 3/2001 | Watanabe et al. | |
| 6,223,303 B1 | 4/2001 | Billings et al. | |
| 6,279,089 B1 | 8/2001 | Schibilla et al. | |
| 6,297,926 B1 | 10/2001 | Ahn | |
| 6,330,626 B1 | 12/2001 | Dennin et al. | |
| 6,381,659 B2 | 4/2002 | Proch et al. | |
| 6,401,149 B1 | 6/2002 | Dennin et al. | |
| 6,470,461 B1 | 10/2002 | Pinvidic et al. | |
| 6,487,631 B2 | 11/2002 | Dickinson et al. | |
| 6,490,635 B1 | 12/2002 | Holmes | |
| 6,530,000 B1 | 3/2003 | Krantz et al. | |
| 6,574,676 B1 | 6/2003 | Megiddo | |
| 6,662,334 B1 | 12/2003 | Stenfort | |
| 6,826,650 B1 | 11/2004 | Krantz et al. | |

FOREIGN PATENT DOCUMENTS

| | | |
|---|---|---|
| EP | 0622726 | 11/1994 |
| EP | 0718827 | 6/1996 |
| GB | 2285166 | 6/1995 |

| | | |
|---|---|---|
| JP | 63-292462 | 11/1988 |
| JP | 01-315071 | 12/1989 |
| JP | 03183067 | 8/1991 |
| WO | 98/14861 | 4/1998 |

OTHER PUBLICATIONS

Written Opinion from the International Searching Authority dated Feb. 20, 2006 for Application No. PCT/US2005/024920; 5 pages.

PCT International Search Report, Doc. No. PCT/US00/15084, Dated Nov. 15, 2000, 2 Pages.

Blathut R. Digital Transmission of Information (Dec. 4, 1990), pp. 429-430.

Hwang, Kai and Briggs, Faye A., "Computer Architecture and Parallel Processing" pp. 156-164.

Zeidman, Bob, "Interleaving DRAMS for faster access", System Design ASIC & EDA, pp. 24-34 (Nov. 1993).

P.M. Bland et. al. Shared Storage Bus Circuitry, IBM Technical Disclosure Bulletin, vol. 25, No. 4, Sep. 1982, pp. 2223-2224.

PCT search report for PCT/US00/07780 mailed Aug. 2, 2000, 4 Pages.

PCT Search Report for PCT/US01/22404, mailed Jan. 29, 2003, 4 Pages.

* cited by examiner

SYSTEM AND METHOD FOR CONTROLLING BUFFER MEMORY OVERFLOW AND UNDERFLOW CONDITIONS IN STORAGE CONTROLLERS

BACKGROUND OF THE INVENTION

1. Field of the Invention

The present invention relates generally to storage device controllers, and more particularly, to efficiently manage data flow from a buffer memory used by the storage controller to transfer data between a host and storage device.

2. Background

Conventional computer systems typically include several functional components. These components may include a central processing unit (CPU), main memory, input/output ("I/O") devices, and streaming storage devices (for example, tape drives/disks) (referred to herein as "storage device").

In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

The storage device is coupled to the host system via a controller that handles complex details of interfacing the storage device to the host system. Communications between the host system and the controller is usually provided using one of a variety of standard I/O bus interfaces.

Typically, when data is read from a storage device, a host system sends a read command to the controller, which stores the read command into a buffer memory. Data is read from the device and stored in the buffer memory.

Various standard interfaces are used to move data from host systems to storage devices. Fibre channel is one such standard. Fibre channel (incorporated herein by reference in its entirety) is an American National Standard Institute (ANSI) set of standards, which provides a serial transmission protocol for storage and network protocols such as HIPPI, SCSI, IP, ATM and others. Fibre channel provides an input/output interface to meet the requirements of both channel and network users.

Host systems often communicate with storage systems using the standard "PCI" bus interface. PCI stands for Peripheral Component Interconnect, a local bus standard that was developed by Intel Corporation®. The PCI standard is incorporated herein by reference in its entirety. Most modern computing systems include a PCI bus in addition to a more general expansion bus (e.g. the ISA bus). PCI is a 64-bit bus and can run at clock speeds of 33 or 66 MHz.

PCI-X is a standard bus that is compatible with existing PCI cards using the PCI bus. PCI-X improves the data transfer rate of PCI from 132 MBps to as much as 1 GBps. The PCI-X standard (incorporated herein by reference in its entirety) was developed by IBM®, Hewlett Packard Corporation® and Compaq Corporation® to increase performance of high bandwidth devices, such as Gigabit Ethernet standard and Fibre Channel Standard, and processors that are part of a cluster.

The iSCSI standard (incorporated herein by reference in its entirety) is based on Small Computer Systems Interface ("SCSI"), which enables host computer systems to perform block data input/output ("I/O") operations with a variety of peripheral devices including disk and tape devices, optical storage devices, as well as printers and scanners.

A traditional SCSI connection between a host system and peripheral device is through parallel cabling and is limited by distance and device support constraints. For storage applications, iSCSI was developed to take advantage of network architectures based on Fibre Channel and Gigabit Ethernet standards. iSCSI leverages the SCSI protocol over established networked infrastructures and defines the means for enabling block storage applications over TCP/IP networks. iSCSI defines mapping of the SCSI protocol with TCP/IP. The iSCSI architecture is based on a client/server model. Typically, the client is a host system such as a file server that issues a read or write command. The server may be a disk array that responds to the client request.

Serial ATA ("SATA") is another standard, incorporated herein by reference in its entirety that has evolved from the parallel ATA interface for storage systems. SATA provides a serial link with a point-to-point connection between devices and data transfer can occur at 150 megabytes per second.

Another standard that has been developed is Serial Attached Small Computer Interface ("SAS"), incorporated herein by reference in its entirety. The SAS standard allows data transfer between a host system and a storage device. SAS provides a disk interface technology that leverages SCSI, SATA, and fibre channel interfaces for data transfer. SAS uses a serial, point-to-point topology to overcome the performance barriers associated with storage systems based on parallel bus or arbitrated loop architectures.

Conventional controllers do not efficiently control buffer memory overflow and underflow conditions because they use a single offset counter with a data flow circuit. As throughput and bandwidth requirements increase, there is a need for a method and system that allow a controller to control data flow using the buffer memory without extensive firmware usage.

SUMMARY OF THE INVENTION

In one aspect of the present invention, a method for maintaining flow control in a buffer memory coupled to a storage controller is provided. The method includes, incrementing (increasing) a first counter value and a second counter value when data is placed in the buffer memory; decrementing (decreasing) a first counter value when data is read from the buffer memory; and decrementing the second counter value when data is sent to a host.

The method further includes pausing a first channel logic between a transport module and a storage disk when there is no data in the buffer memory; and pausing a second channel logic between a disk and the buffer memory if there is no space in the buffer memory. The first channel logic is paused when the first counter value reaches a certain value and the second channel logic is paused when the second counter value reaches a pre-set maximum value.

In yet another aspect of the present invention, a storage controller for transferring data from a storage device to a host is provided. The storage controller includes, a first and second counter that are used to monitor when data is read from a buffer memory and when data is transferred from the buffer memory to the host.

The first and second counters are incremented (increased) by a first channel logic that interfaces between the storage device and the buffer memory. Also, a second channel logic that interfaces between the buffer memory and the host decrements (decreases) the first counter after reading data from the buffer memory and decrements the second counter after data is transferred to the host. The second channel logic also stops when the first counter is zero or reaches a certain value. The first channel logic pauses when the second counter reaches a pre-set value.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

Controller Overview:

To facilitate an understanding of the preferred embodiment, the general architecture and operation of a controller will initially be described. The specific architecture and operation of the preferred embodiment will then be described with reference to the general architecture.

Figure 1A:
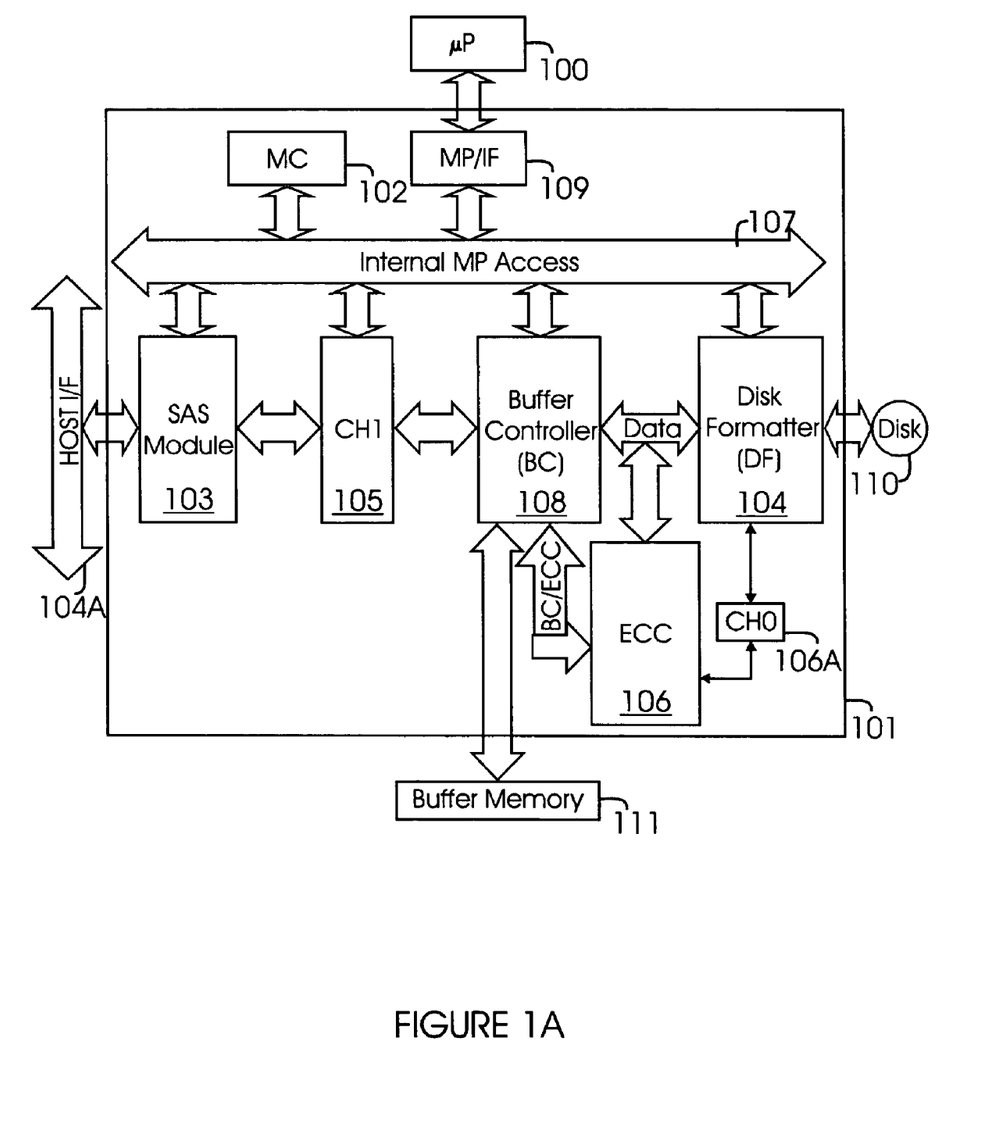
FIG. 1A shows an example of a storage drive system used with the adaptive aspects of the present invention.

FIG. 1A shows an example of a storage drive system (with an optical disk or tape drive), included in (or coupled to) a computer system. The host computer (not shown) and the storage device 110 (also referred to as disk 110) communicate via a port using a disk formatter "DF" 104. In an alternate embodiment (not shown), the storage device 110 is an external storage device, which is connected to the host computer via a data bus. The data bus, for example, is a bus in accordance with a Small Computer System Interface (SCSI) specification. Those skilled in the art will appreciate that other communication buses known in the art can be used to transfer data between the drive and the host system.

As shown in FIG. 1A, the system includes controller 101, which is coupled to buffer memory 111 and microprocessor 100. Interface 109 serves to couple microprocessor bus 107 to microprocessor 100 and a micro-controller 102 and facilitates transfer of data, address, timing and control information. A read only memory ("ROM") omitted from the drawing is used to store firmware code executed by microprocessor 100.

Controller 101 can be an integrated circuit (IC) that comprises of various functional modules, which provide for the writing and reading of data stored on storage device 110.

Buffer memory 111 is coupled to controller 101 via ports to facilitate transfer of data, timing and address information. Buffer memory 111 may be a double data rate synchronous dynamic random access memory ("DDR-SDRAM") or synchronous dynamic random access memory ("SDRAM"), or any other type of memory.

Disk formatter 104 is connected to microprocessor bus 107 and to buffer controller 108. A direct memory access ("DMA") DMA interface (not shown) is connected to microprocessor bus 107 and to data and control port (not shown).

Buffer controller (also referred to as "BC") 108 connects buffer memory 111, channel one (CH1) logic 105, channel zero (CH0) logic 106A, error correction code ("ECC") module 106 to bus 107. Buffer controller 108 regulates data movement into and out of buffer memory 111.

CH1 logic 105 is functionally coupled to SAS module 103 that is described below in detail. CH1 Logic 105 interfaces between buffer memory 111 and SAS module 103. SAS module 103 interfaces with host interface 104A to transfer data to and from disk 110.

Data flow between a host and disk passes through buffer memory 111 via channel 0 (CH0) logic 106A, and via channel one (CH1) logic 105. ECC module 106 generates ECC that is saved on disk 110 during a write operation and provides correction mask to BC 108 for disk 110 read operation.

The channels (CH0 106A and CH1 105 and Channel 2 (not shown) are granted arbitration turns when they are allowed access to buffer memory 111 in high speed burst write or read operations for a certain number of clocks. The channels use first-in-first out ("FIFO") type memories to store data that is in transit. Firmware running on processor 100 can access the channels based on bandwidth and other requirements.

To read data from device 110, a host system sends a read command to controller 101, which stores the read commands in buffer memory 111. Microprocessor 100 then reads the command out of buffer memory 111 and initializes the various functional blocks of controller 101. Data is read from device 110 and is passed to buffer controller 108.

To write data, a host system sends a write command to disk controller 101, which is stored in buffer 111. Microprocessor 100 reads the command out of buffer 111 and sets up the appropriate registers. Data is transferred from the host and is first stored in buffer 111, before being written to disk 110. Cyclic redundancy code ("CRC") values are calculated based on a logical block address ("LBA") for the sector being written. Data is read out of buffer 111, appended with ECC code and written to disk 110.

Figure 1B:
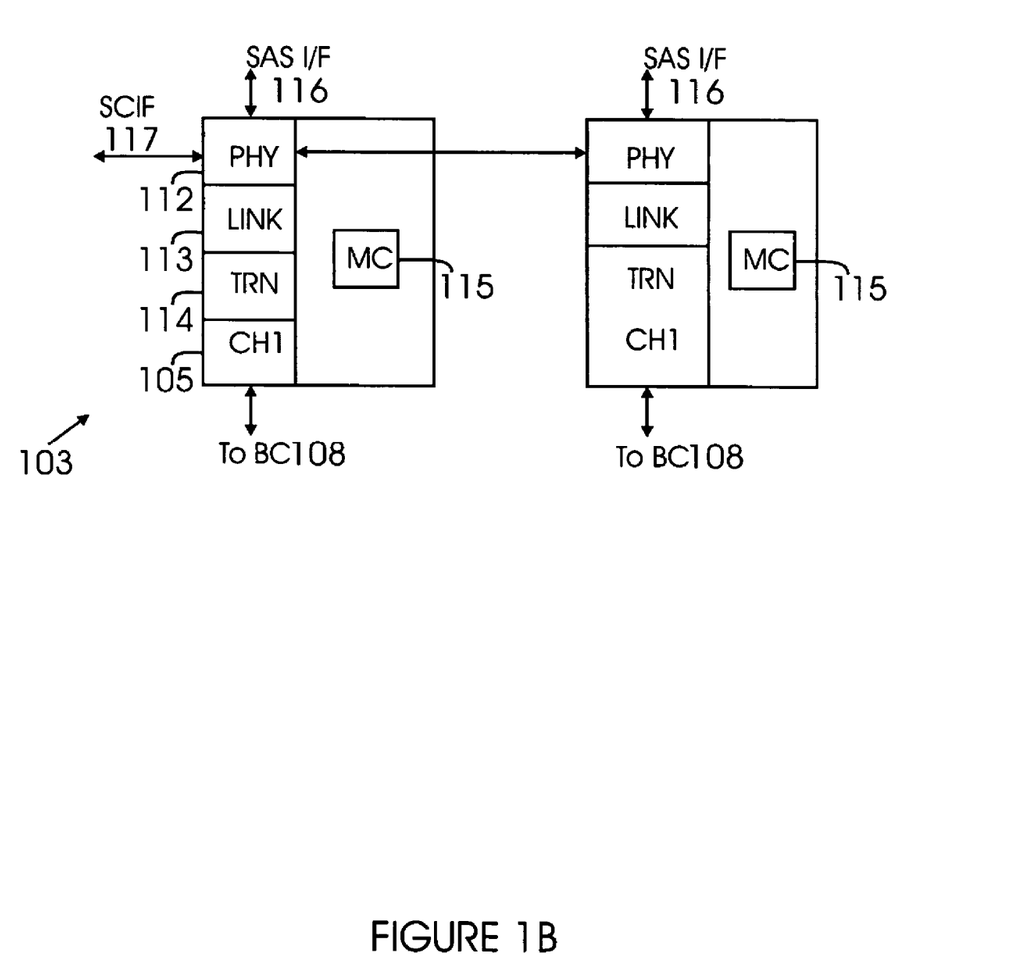
FIG. 1B shows a block diagram of a SAS module used in a controller, according to one aspect of the present invention.
Figure 1C:
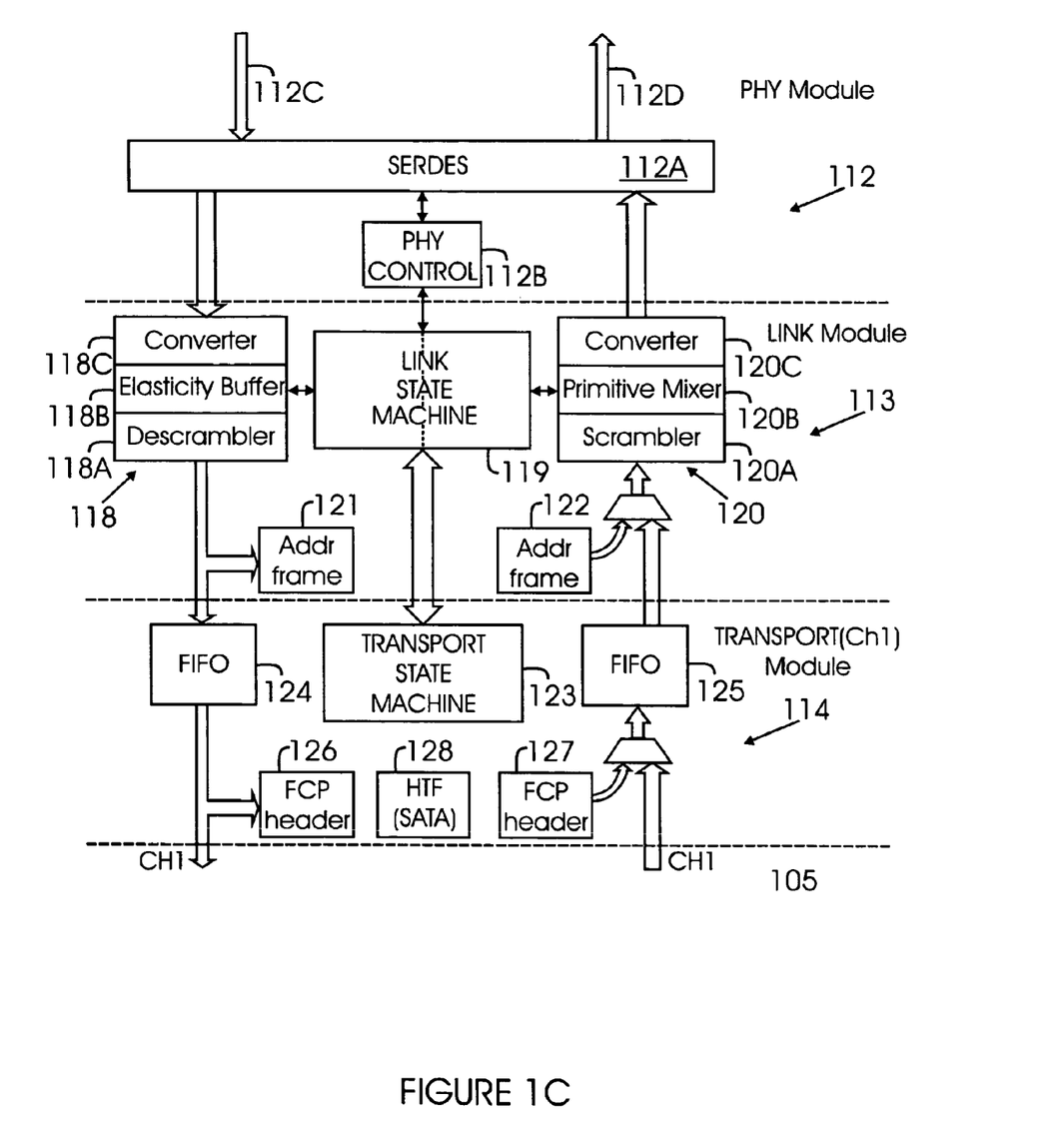
FIG. 1C shows a detailed block diagram of a SAS module, according to one aspect of the present invention.
Figure 1D:
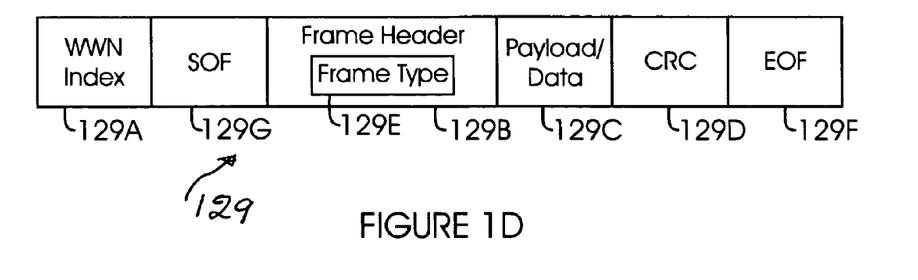
FIG. 1D shows a SAS frame that is received/transmitted using the SAS module according to one aspect of the present invention.

Frame Structure:

FIG. 1D shows a SAS frame 129 that is received/transmitted using SAS module 103. Frame 129 includes a WWN value 129A, a start of frame ("SOF") value 129G, a frame header 129B that includes a frame type field 129E, payload/data 129C, CRC value 129D and end of frame ("EOF") 129F. The SAS specification addresses all devices by a unique World Wide Name ("WWN") address.

Also, a frame may be an interlock or non-interlocked, specified by field 129E (part of header 129E). For an interlock frame, acknowledgement from a host is required for further processing, after the frame is sent to the host. Non-interlock frames are passed through to a host without host acknowledgement (up to 256 frames per the SAS standard).

SAS Module 103:

FIG. 1B shows a top level block diagram for SAS module 103 used in controller 101. SAS module 103 includes a physical ("PHY") module 112, a link module 113 and a transport module ("TRN") 114 described below in detail. A microcontroller 115 is used to co-ordinate operations between the various modules. A SAS interface 116 is also provided to the PHY module 112 for interfacing with a host and interface 117 is used to initialize the PHY module 112.

FIG. 1C shows a detailed block diagram of SAS module 103 with various sub-modules. Incoming data 112C is received from a host system, while outgoing data 112D is sent to a host system or another device/component.

PHY Module 112:

PHY module 112 includes a serial/deserializer ("SERDES") 112A that serializes encoded data for transmission 112D, and de-serializes received data 112C. SERDES 112A also recovers a clock signal from incoming data stream 112C and performs word alignment.

PHY control module 112B controls SERDES 112A and provides the functions required by the SATA standard.

Link Module 113:

Link module 113 opens and closes connections, exchanges identity frames, maintains ACK/NAK (i.e. acknowledged/not acknowledged) balance and provides credit control. As shown in FIG. 1C, link module 113 has a receive path 118 that receives incoming frames 112C and a transmit path 120 that assists in transmitting information 112D. Addresses 121 and 122 are used for received and transmitted data, respectively.

Receive path 118 includes a converter 118C for converting 10-bit data to 8-bit data, an elasticity buffer/primitive detect segment 118B that transfers data from a receive clock domain to a transmit block domain and decodes primitives. Descrambler module 118A unscrambles data and checks for cyclic redundancy check code ("CRC").

Transmit path 120 includes a scrambler 120A that generates CRC and scrambles (encodes) outgoing data; and primitive mixer module 120B that generates primitives required by SAS protocol/standard and multiplexes the primitives with the outgoing data. Converter 120C converts 8-bit data to 10-bit format.

Link module 113 uses plural state machines 119 to achieve the various functions of its sub-components. State machines 119 include a receive state machine for processing receive frames, a transmit state machine for processing transmit frames, a connection state machine for performing various connection related functions and an initialization state machine that becomes active after an initialization request or reset.

Transport module 114:

Transport module 114 interfaces with CH1 105 and link module 113. In transmit mode, TRN module 114 receives data from CH1 105, loads the data (with fibre channel header (FCP) 127) in FIFO 125 and sends data to Link module 113 encapsulated with a header (129B) and a CRC value (129D). In receive mode, TRN module 114 receives data from link module 113 (in FIFO 124), and re-packages data (extracts header 126 and 128) before being sent to CH1 105. CH1 105 then writes the data to buffer 111. State machine 123 is used to co-ordinate data transfer in the receive and transmit paths.

Figure 2:
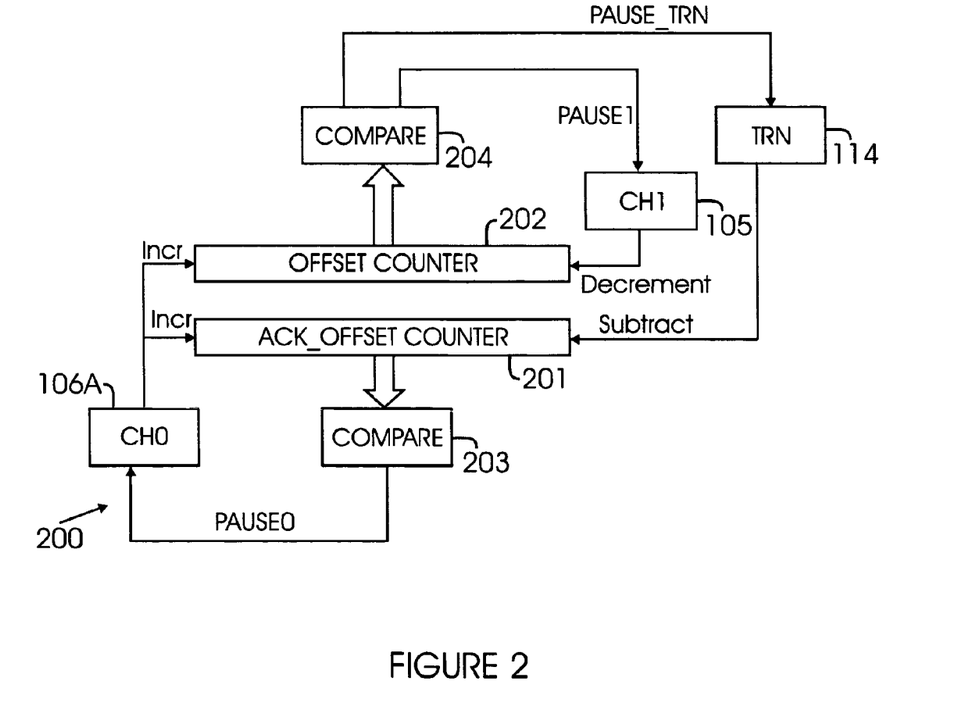
FIG. 2 shows a block diagram of a system using two counters for tracking buffer memory space availability, overflow and underflow conditions, according to one aspect of the present invention.

Dual Offset Counters:

FIG. 2 shows a block diagram of a system 200 using two counters for tracking buffer memory 111 data or space availability, overflow and underflow conditions. System 200 includes an offset counter 202 and an ACK_OFFSET counter 201. Counters 201 and 202 are incremented by CH0 logic 106A. When CH1 105 reads a frame from buffer memory 111, counter 202 is decremented. Counter 201 is decremented when a frame is sent to the host successfully.

Compare module 204, based on counter 202 value generates a pause signal that pauses CH1 logic 105 and transport port module 114. Compare module 203 generates a pause signal to pause CH0 logic 106A.

CH1 logic 105 is stopped or paused when counter 202 reaches a certain value, for example 0, indicating that there is no more data in buffer memory 111.

CH0 logic 106A is paused or stopped when counter 201 reaches a certain preset value indicating that there is no space available in buffer memory 111. Firmware of controller 101 may be used to pre-set the maximum value.

Figure 3:
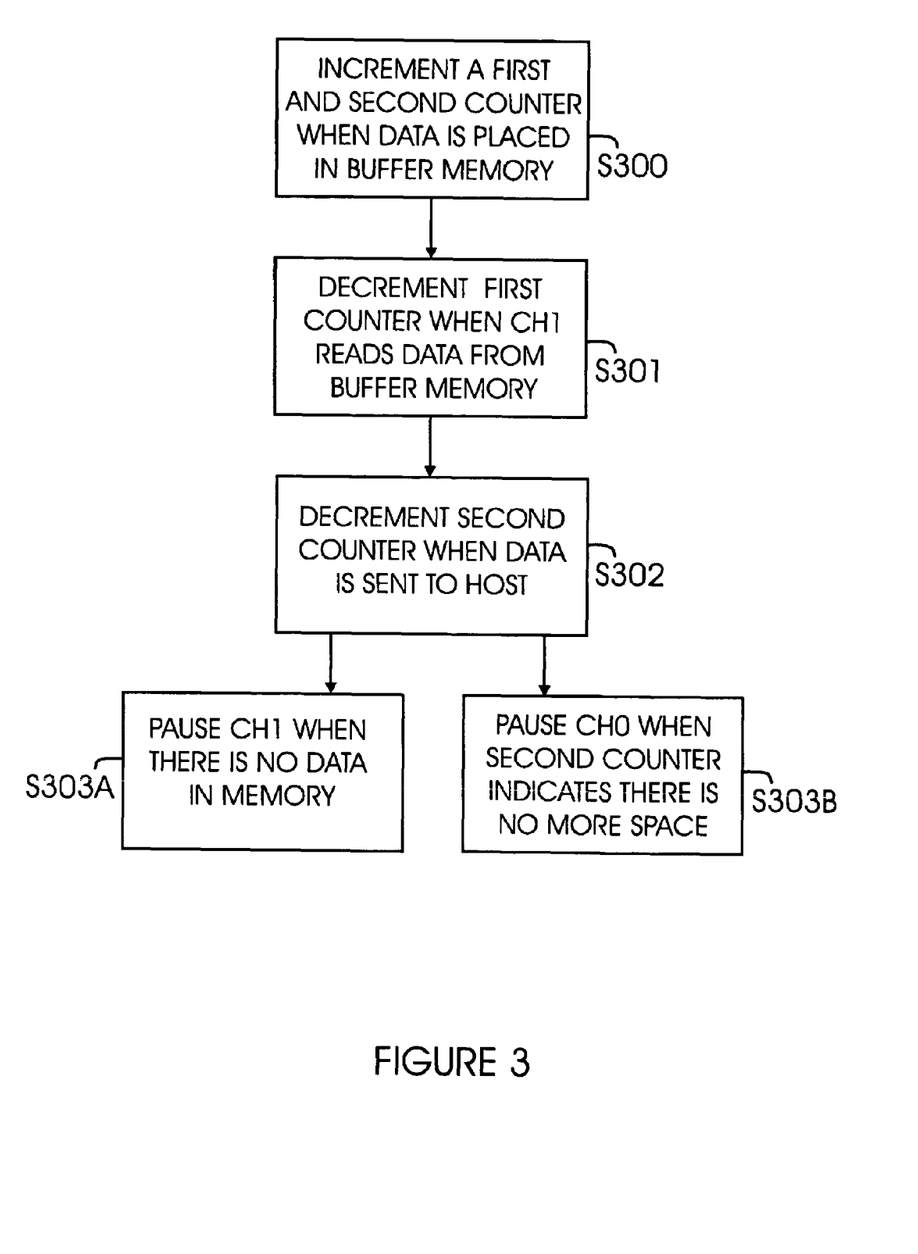
FIG. 3 shows a process flow diagram for managing buffer memory, according to one aspect of the present invention.

FIG. 3 is a process flow diagram for managing buffer memory 111 to avoid underflow and/or overflow conditions. Turning in detail to FIG. 3, in step S300, CH0 106A logic increments counters 201 and 202 when data is placed in buffer memory 111.

In step S301, counter 202 is decremented when CH1 105 reads data from buffer memory 111.

In step S302, the ACKOFFSET(or second) counter 201 is decremented when transport module 114 sends a data frame to the host.

In step S303A, CH1 105 is paused when counter 202 reaches a certain value, for example, 0, indicating that buffer memory 111 has no space available for storage.

In step S303B, CH0 106A is paused when counter 201 reaches a pre-set value indicating that there is no more space available in buffer memory 111.

Figure 4:
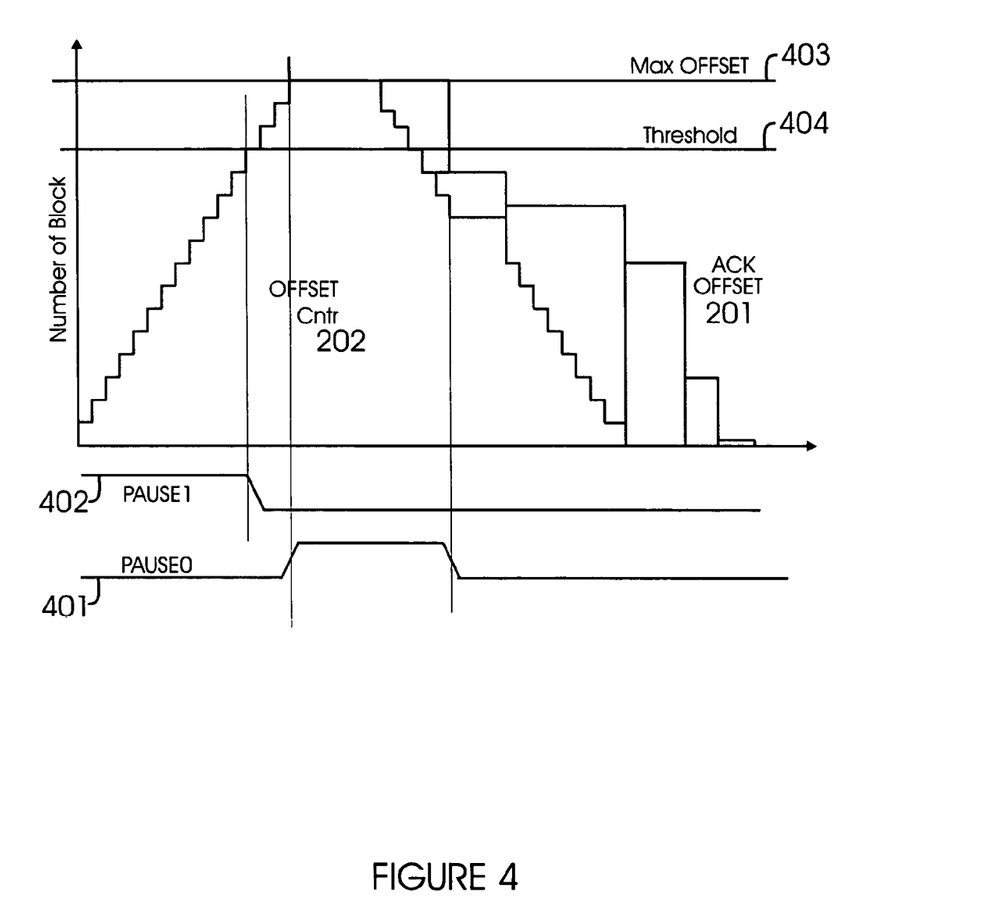
FIG. 4 shows a graphical representation of various signals that are generated by the system of FIG. 2, according to one aspect of the present invention.

FIG. 4 shows a graphical representation of various signals that are generated by system 200. PAUSE0 signal 401 is used to pause CH0 106A and PAUSE1 signal 402 is used to pause CH1 105. Threshold value 404 is the starting value for counters 201 and 202 and the maximum offset value 403 is the maximum counter value that is pre-set for counter 201.

In one aspect of the present invention, by using dual offset counters, data flow is maintained efficiently in buffer memory 111.

Although the present invention has been described with reference to specific embodiments, these embodiments are illustrative only and not limiting. Many other applications and embodiments of the present invention will be apparent in light of this disclosure.

What is claimed is:

1. A storage controller that transfers data between a storage device and a host, the storage controller comprising:
   a buffer memory configured to store the data being transferred between the storage device and the host;
   a first counter;
   a second counter;
   a first channel logic connected between the buffer memory and the storage device, the first channel logic configured to increment each of the first counter and the second counter when the data is placed in the buffer memory;
   a serial attached small computer interface (SAS) module interfacing with the host, wherein the SAS module includes a transport module configured to i) send the data to the host and ii) decrement the second counter when the data is successfully sent to the host;
   a second channel logic interfacing between the SAS module and the buffer memory, wherein the second channel logic is configured to i) read the data from the buffer memory and ii) decrement the first counter when the data is read from the buffer memory;
   a first compare module configured to generate a first pause signal to pause each of the second channel logic and the transport module in response to the first counter reaching a first value, wherein the first value indicates that there is no data in the buffer memory; and
   a second compare module configured to generate a second pause signal to pause the first channel logic in response to the second counter reaching a second value, wherein the second value indicates that there is no available space in the buffer memory.

2. The storage controller of claim 1, wherein the data is frame-based data.

3. The storage controller of claim 1, wherein the first value is 0.

4. The storage controller of claim 1, wherein the second value is a predetermined maximum value.

5. The storage controller of claim 1, wherein the first channel logic and the second channel logic are configured to store the data using first-in-first out memory.

6. A method of transferring data between a storage device and a host, the method comprising:
   storing, in a buffer memory, the data being transferred between the storage device and the host;
   using a first channel logic connected between the buffer memory and the storage device, incrementing a first counter and a second counter when the data is placed in the buffer memory;
   using a transport module, i) sending the data to the host and ii) decrementing the second counter when the data is successfully sent to the host, wherein the transport module is located in a serial attached small computer interface (SAS) module interfacing with the host;
   using second channel logic interfacing between the SAS module and the buffer memory, i) reading the data from the buffer memory and ii) decrementing the first counter when the data is read from the buffer memory;
   using a first compare module, generating a first pause signal to pause the second channel logic and the transport module in response to the first counter reaching a first value, wherein the first value indicates that there is no data in the buffer memory; and
   using a second compare module, generating a second pause signal to pause the first channel logic in response to the second counter reaching a second value, wherein the second value indicates that there is no available space in the buffer memory.

7. The method of claim 6, wherein the data is frame-based data.

8. The method of claim 6, wherein the first value is 0.

9. The method of claim 7, wherein the second value is a predetermined maximum value.

10. The method of claim 7, further comprising storing the data using first-in-first out memory in the first channel logic and the second channel logic.

* * * * *